US005790045A

United States Patent [19]

Hymel et al.

[11] Patent Number: 5,790,045

[45] Date of Patent: Aug. 4, 1998

[54] METHOD AND APPARATUS FOR GENERATING ALERTS IN A MESSAGING DEVICE

[75] Inventors: James Allen Hymel, Lake Worth; Thomas L. Klein, West Palm Beach, both of Fla.; Christian D. Herrick, Duluth, Ga.

[73] Assignee: Motorola, Inc., Schaumburg, Ill.

[21] Appl. No.: 728,115

[22] Filed: Oct. 9, 1996

[51] Int. Cl.[6] .......... G06F 9/00

[52] U.S. Cl. .......... 340/825.44; 340/311; 340/825.48; 340/521; 340/311.1; 455/38.4

[58] Field of Search .......... 340/825.44, 311, 340/521, 825.48, 311.1; 455/38.4

[56] References Cited

U.S. PATENT DOCUMENTS

| | | | |
|---|---|---|---|
| 4,538,138 | 8/1985 | Harvey et al. | 340/521 |
| 4,829,466 | 5/1989 | Davis et al. | 340/311.1 |

*Primary Examiner*—Michael Horabik
*Assistant Examiner*—Yves Dalencourt

[57] ABSTRACT

A messaging device (100) for generating alerts indicative of message reception includes a receiver (105) for receiving a message, a memory (125, 130, 140) in which information unrelated to the alerts is stored, and an alert device (155) for generating, to announce message reception, an alert that is a function of bits of the information.

15 Claims, 2 Drawing Sheets

METHOD AND APPARATUS FOR GENERATING ALERTS IN A MESSAGING DEVICE

FIELD OF THE INVENTION

This invention relates in general to messaging devices, and more specifically to messaging devices that include mechanisms for generating alerts.

BACKGROUND OF THE INVENTION

Messaging devices, such as portable radio receivers, usually generate alerts to announce reception of messages. Such alerts include, for instance, visible displays, audible tones, and vibratory alerts. In some conventional messaging devices, the user can set the type of alert to be generated for different categories of messages, e.g., personal or business, and for different messages sources, e.g., information services or in-house paging system. However, the user will thereafter always be alerted with the programmed alert to announce messages of a particular category or source until he physically reprograms his messaging device. This lack of variety can become monotonous to the user of conventional messaging devices. Therefore, an opportunity exists to provide a variety of alerts to announce message reception.

DESCRIPTION OF A PREFERRED EMBODIMENT

Figure 1:
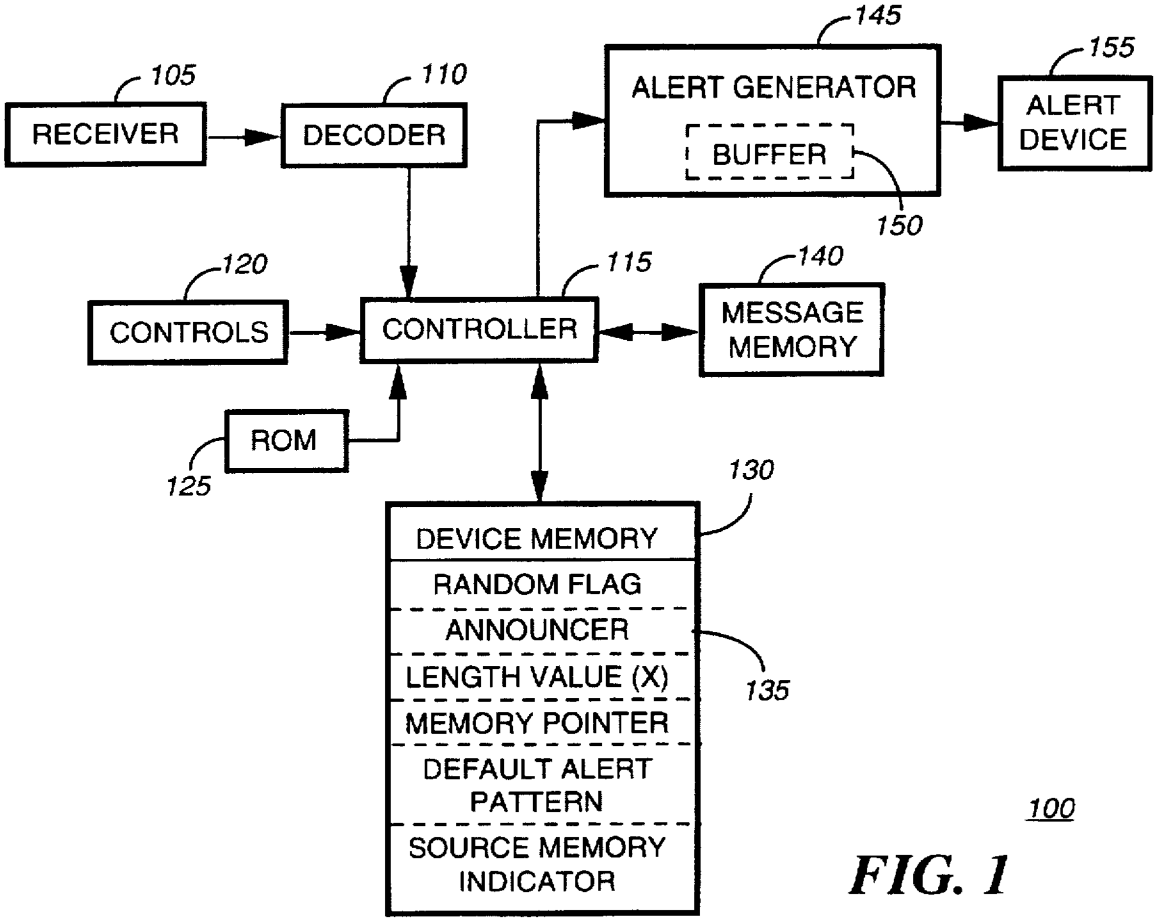
FIG. 1 is an electrical block diagram of a messaging device for generating alerts in accordance with the present invention.

FIG. 1 shows a messaging device 100, such as a portable radio receiver or personal communicator, for receiving message information in the form of messages addressed to the messaging device 100. The messaging device 100 comprises a receiver 105 for receiving a signal and a decoder 110 for decoding the signal to recover a message. A controller 115 further processes the message and stores it in the message memory 140. Another memory, such as a read only memory (ROM) 125, is also coupled to the controller 115 for storing device parameters, such as an address of the messaging device 100.

The messaging device 100 further comprises controls 120 for providing user-initiated commands to the controller 115, an alert device 155, such as a transducer or speaker, for emitting an alert to announce message reception, and an alert generator 145 for driving the alert device 155 with an alert pattern stored in a buffer 150.

According to the present invention, the user can program the device 100 to generate either a default alert or a random alert to announce message reception. In the default mode, reception of a message intended for the messaging device 100 results in the alert generator 145 driving the alert device 155 with a default alert pattern, such as a preprogrammed sequence of tones. In the random mode, reception of a message causes the alert device 155 to be driven with an alert pattern constructed from bytes of information stored in any memory device included in the messaging device 100, as will be explained in greater detail below. Since information in a memory device, such as the message memory 140, can be changed, alerts generated by the alert device will be unpredictable and therefore random in nature.

Generation of the random alerts in accordance with the present invention is an appealing feature for alerting the user to newly received messages with a variety of different alerts. In this manner, the user does not become bored with never-changing, monotonous tones to announce message reception. Instead, he is continually surprised with variations in alert sequences. Reception of a first message could, for example, result in an alert comprising a particular number of low frequency tones, while reception of a next message could result in an alert comprising high frequency tones or a combination of low and high frequency tones.

A device memory 130 included in the messaging device 100 preferably stores device information and firmware executed to generate alerts announcing message reception. This information includes a random flag that is set when the alerts are to be random. The random flag can be set or cleared based on user programming via the controls 120. When cleared, a stored default alert pattern is preferably used to drive the alert device 155. A programmable source memory indicator is stored to indicate which of the memory devices in the messaging device 100 is to be the source of information bytes used in formulating the alert patterns for the random alerts, and a pointer indicates memory locations from which the bytes are retrieved. The pointer can, for instance, comprise one or more memory addresses. Alternatively, the pointer could comprise a flag or other indicator stored in the memory device associated with the source memory indicator. A length value $\chi$ indicates the number of bytes of information that will be drawn from the source memory to generate a random alert. The length value is preferably programmable, such as via the controls 120, and can vary based upon the length of alert desired by the user. When, for instance, an alert comprising sixteen tones is desired, the length value $\chi$ is set to equal sixteen (16) so that sixteen bytes are retrieved from the source memory for generating the alert.

The messaging device 100 further comprises an announcer 135 for retrieving bytes of information from the designated source memory, e.g., the ROM 125, the message memory 140, or even the device memory 130, at the location indicated by the pointer. Selected portions of the retrieved bytes are then loaded into the buffer 150 for driving the alert device 155. The number of bits selected from each of the retrieved bytes is a function of the type of alert device 155. For instance, many conventional transducers can emit sixteen different frequencies. Therefore, it would take four bits to indicate which frequency is to be generated. When such a transducer is used as the alert device 155, the announcer 135 would select four bits, e.g., the first four bits, the last four bits, etc., from each retrieved byte for loading into the buffer 150. Alternatively, the announcer 135 could multiply the length value $\chi$, e.g., sixteen (16), by the number of bits, e.g., four (4), required for indicating a frequency to result in a total number of required bits, e.g., sixty-four (64). The announcer 135 could then retrieve a number of bits equal to the total number of required bits from the designated source memory beginning at the location indicated by the pointer.

In either case, the announcer 135 then advances the pointer to a next location in the source memory. Preferably, the pointer is advanced past the location in which the retrieved information is stored. The announcer 135 can be implemented in firmware stored by the device memory 130 and executed by the controller 115. Alternatively, the announcer 135 could be implemented in hardware capable of performing equivalent operations.

Figure 2:
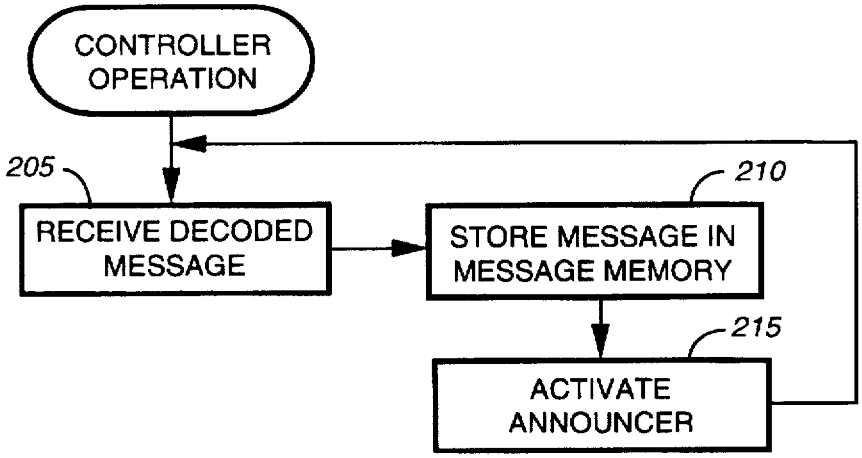
FIG. 2 is a flowchart of an operation of a controller included in the messaging device of FIG. 1 in accordance with the present invention.

FIG. 2 is a flowchart of an operation of the controller 115 according to the present invention. At step 205, the controller 115 receives a decoded message and, at step 210, stores the message in the message memory 140. The controller 115 then, at step 215, activates the announcer 135.

Figure 3:
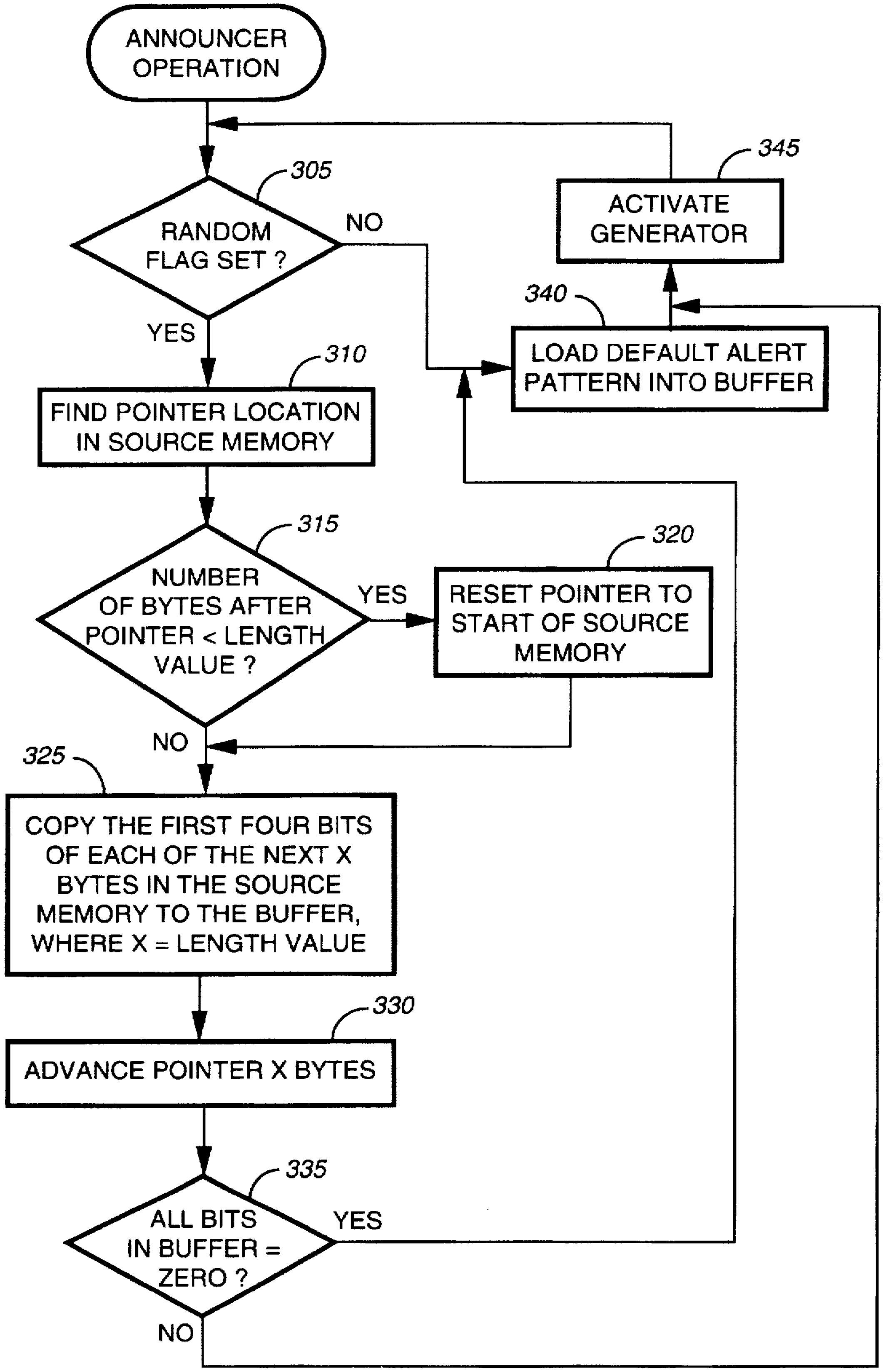
FIG. 3 is a flowchart of an operation of an announcer included in the messaging device of FIG. 1 in accordance with the present invention.

Referring next to FIG. 3, a flowchart illustrates an operation of the announcer 135. After activation by the controller 115, the announcer 135 determines, at step 305, whether the random flag is set. When the random flag is not set, i.e., when the messaging device 100 is in the default mode, the default alert pattern is retrieved and loaded into the buffer 150, at step 340. Thereafter, the alert generator 145 is activated, at step 345, to drive the alert device 155 with the default pattern. When the random flag is set, i.e., when the messaging device 100 is in the random mode, the device memory 130 is referenced to select a memory device, e.g., the ROM 125, the message memory 140, or the device memory 130, based on the source memory indicator, and a particular location in the source memory is found, at step 310, by reference to the pointer.

When, at step 315, the number of bytes stored in locations after that indicated by the pointer is less than the length value $\chi$, the pointer is reset, at step 320, to the start of the source memory. When, at step 315, the number of remaining bytes is not less than $\chi$, a selected portion of each of the next $\chi$ bytes is used to form an alert pattern. As mentioned above, the selected portion is preferably equivalent to the number of bits required to designate a frequency that can be generated by the alert device 155. In this manner, the announcer 135 can combine or string together the selected bits of the retrieved bytes to form an alert pattern that is then loaded into the buffer 150, at step 325. Next, at step 330, the pointer is advanced by $\chi$ bytes to designate a next memory location in the source memory.

The announcer 135 preferably also checks, at step 335, whether all (or a predetermined number) of the bits loaded into the buffer 150 equal zero. When so, the default pattern is loaded, at step 340, into the buffer 150 to ensure that the user gets an adequate announcement of a message instead of no alert or an inordinately short alert. At step 345, the generator 145 is activated to generate, for a predetermined amount of time, each of the tones indicated by the sequence of bits comprising the stored alert pattern.

As described above, the source memory is chosen from among the ROM 125, the device memory 130, and the message memory 140. However, it will be appreciated by one of ordinary skill in the art that any memory device, such as a database, hard drive, or random access memory, included in the messaging device 100 can be used as the source memory. It will also be appreciated that the alerts that are randomly generated by the process illustrated in FIG. 3 can occur responsive to any event and are not limited to announcement of message reception.

In summary, the messaging device as described above can be set in a random mode in which alerts provided to the user vary as a function of stored information that can be modified or deleted and that is unrelated to alert information. Specifically, an announcer included in the messaging device selects a number of bits from a designated source memory, such as a message memory or a read only memory, and loads the bits into an alert buffer. The bits are then used by an alert generator for driving an alert device to generate a sequence of tones at frequencies indicated by the bits.

When, for instance, the alert device is capable of generating tones at sixteen different frequencies, each of the sixteen frequencies could be indicated by a different four-bit pattern. Using this example, the announcer could select a programmable number $\chi$ of bytes from the message memory, then select four bits from each of the $\chi$ bytes. When $\chi x=3$, for instance, three four-bit patterns would then be loaded into the alert buffer, and the alert device would be driven to generate three tones corresponding in sequence to the three four-bit patterns. If the loaded alert pattern comprised 0001-1111-1010, for example, the alert device would generate a tone at a first frequency, followed by a tone at a sixteenth frequency, followed by a tone at a ninth frequency.

According to the present invention, after loading a pattern into the alert buffer, the announcer moves a pointer to another memory location from which a next pattern of bits will be drawn. This way, the next alert will be generated as a function of the information stored in the new memory location. As a result, the alerts indicative of device events, such as message reception, will be randomly generated so that the user is presented with an appealing variety of alerts.

What is claimed is:

1. A messaging device for generating an alert indicative of message reception, comprising:

a receiver for receiving a message;

a memory in which information unrelated to the alerts is stored;

an alert device for generating the alert coupled to the receiver and the memory, wherein the alert is a function of bits of the information;

a pointer indicative of a memory location in which the bits are stored; and an announcer coupled to the pointer for driving the alert device with the bits and advancing, prior to reception of a next message, the pointer to a next memory location, wherein bits stored in the next memory location determine a next alert generated to announce reception of the next message.

2. The messaging device of claim 1, wherein the memory comprises a read only memory.

3. The messaging device of claim 1, wherein the memory comprises a message memory for storing the message, and wherein the bits comprise bits of message information.

4. The messaging device of claim 1, wherein a length value is stored to indicate length of the alert, the length value determining a number of the bits.

5. A messaging device for generating an alert indicative of message reception, comprising:

a receiver for receiving a message;

a memory in which information unrelated to the alerts is stored;

an alert device for generating the alert coupled to the receiver and the memory, wherein the alert is a function of bits of the information;

a random flag indicative of whether random alerts are to be generated to announce reception of messages; and an announcer coupled to the random flag for driving the alert device with the bits when the random flag is set and for driving the alert device with a default alert pattern when the random flag is not set.

6. The messaging device of claim 5, wherein the memory comprises a read only memory.

7. The messaging device of claim 5, wherein the memory comprises a message memory for storing the message, and wherein the bits comprise bits of message information.

8. The messaging device of claim 5, wherein a length value is stored to indicate length of the alert, the length value determining a number of the bits.

9. A messaging device for generating alerts, comprising:

a receiver;

a message memory in which message information received by the receiver is stored;

an announcer coupled to the message memory and selecting bits of the message information;

an alert device for generating an alert as a function of the bits selected by the announcer to announce reception of a message by the receiver; and a pointer indicative of a location in the message memory, wherein the announcer advances the pointer after selecting the bits of the message information.

10. A messaging device for generating alerts, comprising:

a receiver;

a message memory in which message information received by the receiver is stored;

an announcer coupled to the message memory and selecting bits of the message information;

an alert device for generating an alert as a function of the bits selected by the announcer to announce reception of a message by the receiver; and a pointer indicative of a location in the message memory, wherein, prior to reception of a next message, the announcer advances the pointer after selecting the bits of the message information.

11. A method for generating alerts in a messaging device, the method comprising the steps of:

selecting a memory location in which bits of information unrelated to the alerts are stored;

receiving a message;

generating an alert as a function of the bits to announce message reception; and determining, prior to the generating step, whether a random flag is set;

performing the generating step when the random flag is set; and generating a default alert that is not a function of the bits when the random flag is not set.

12. The method of claim 11, wherein the selecting step comprises the step of selecting the memory location prior to the receiving step.

13. The method of claim 12, further comprising the step of:

selecting another memory location in which other bits of information unrelated to the alerts are stored, the other bits to be used in announcing reception of a next message.

14. The method of claim 11, further comprising, prior to the generating step, the steps of:

retrieving a number of bytes stored at the memory location, the number equivalent to a length value;

selecting four bits of each of the number of bytes to result in the bits used in generating the alert; and storing the bits in a buffer.

15. The method of claim 11, further comprising, prior to the selecting step, the step of:

storing a source memory indicator indicative of a memory from which the bits in the memory location are to be selected.

* * * * *